(12) United States Patent
Choi et al.

(10) Patent No.: US 10,077,381 B2
(45) Date of Patent: Sep. 18, 2018

(54) POLISHING SLURRY COMPOSITION

(71) Applicant: K.C. Tech Co., Ltd., Anseong-si (KR)

(72) Inventors: Dong Kyu Choi, Anseong-si (KR);
Young Ho Yoon, Anseong-si (KR);
Hyun Goo Kong, Anseong-si (KR); Jin Sook Hwang, Anseong-si (KR); Han Teo Park, Anseong-si (KR)

(73) Assignee: KCTech Co., Ltd., Anseong-si (KR)

( * ) Notice: Subject to any disclaimer, the term of this patent is extended or adjusted under 35 U.S.C. 154(b) by 36 days.

(21) Appl. No.: 15/205,684

(22) Filed: Jul. 8, 2016

(65) Prior Publication Data
US 2017/0022391 A1 Jan. 26, 2017

(30) Foreign Application Priority Data

Jul. 20, 2015 (KR) .................. 10-2015-0104263
Aug. 10, 2015 (KR) .................. 10-2015-0112432

(51) Int. Cl.
B44C 1/22 (2006.01)
C03C 15/00 (2006.01)
C03C 25/68 (2006.01)
C23F 1/00 (2006.01)
C09G 1/02 (2006.01)
C23F 3/06 (2006.01)

(52) U.S. Cl.
CPC . *C09G 1/02* (2013.01); *C23F 3/06* (2013.01)

(58) Field of Classification Search
USPC .......................................... 216/89
See application file for complete search history.

(56) References Cited

U.S. PATENT DOCUMENTS

2012/0028466 A1* 2/2012 McConnell ........... B24B 37/044
438/692

FOREIGN PATENT DOCUMENTS

| CN | 1646650 A | 7/2005 |
|---|---|---|
| CN | 1854225 A | 11/2006 |
| CN | 101611476 A | 12/2009 |
| CN | 106415796 A | 2/2017 |
| CN | 106661429 A | 5/2017 |
| KR | 10-2005-0073044 A | 7/2005 |
| KR | 10-0623963 B1 | 9/2006 |
| KR | 10-2009-0128389 A | 12/2009 |
| KR | 10-2012-0134105 A | 12/2012 |
| TW | 201131020 A | 9/2011 |
| TW | 201139633 A | 11/2011 |

* cited by examiner

*Primary Examiner* — Roberts Culbert
(74) *Attorney, Agent, or Firm* — Oblon, McClelland, Maier & Neustadt, L.L.P.

(57) ABSTRACT

A polishing slurry composition is provided. The polishing slurry composition includes at least two types of abrasive particles among first abrasive particles, second abrasive particles, and third abrasive particles, and an oxidizer. A peak-to-valley roughness Rpv decreases when a contact area between the abrasive particles and a tungsten-containing film increases.

13 Claims, 2 Drawing Sheets

POLISHING SLURRY COMPOSITION

CROSS-REFERENCE TO RELATED APPLICATIONS

This application claims the benefit of Korean Patent Application No. 10-2015-0104263 and of Korean Patent Application No. 10-2015-0112432, respectively filed on Jul. 23, 2015 and Aug. 10, 2015, in the Korean Intellectual Property Office, the disclosures of which are incorporated herein by reference.

BACKGROUND

1. Field of the Invention

Embodiments relate to a polishing slurry composition.

2. Description of the Related Art

With a decrease in design rules for products, a width decreases and a height increases in a structure, and accordingly an aspect ratio, that is, a depth/bottom width ratio is drastically increasing. Also, an influence of scratches occurring in a 30-nanometer semiconductor process is at least two times higher than an influence of scratches occurring in a 50-nanometer semiconductor process according to a related art. Thus, not only scratches but a planarization degree also has sensitive effects on a surface of a film. A polishing amount and a quality of a polished surface are regarded as crucial factors in a polishing process. Importance of a quality of a polished surface is maximized based on a decrease in design rules for semiconductors in recent years, and accordingly a polishing process for the quality of the polished surface tends to be added.

Recently, lower current leakage is required based on an increase in integration of a semiconductor. To satisfy such a requirement, a structure of a dielectric with a high dielectric constant and a metal gate is designed. Generally, aluminum is frequently used as a metal gate material. The decrease in design rules makes it difficult to completely deposit and polish aluminum oxide with a high hardness, and thus extensive studies on use of tungsten as a gate material are recently conducted. However, as a constituent material of a gate is changed from aluminum to tungsten, tungsten topographies are formed due to a particle size of tungsten crystals after deposition, which causes an undesired short circuit between metals to reduce a semiconductor yield. To improve a quality of a polished surface of tungsten, that is, to improve a planarization degree, polishing is essential for a next-generation process. A slurry composition in which a planarization degree is not improved causes over-etching or un-etching of tungsten in a post-polishing process to bring about process defects or to make an operation of a device unstable, thereby drastically reducing a semiconductor yield. In addition, because most slurry compositions for polishing tungsten according to a related art are designed to be optimized for a polishing amount or a selectivity with titanium and silicon oxide films, the slurry compositions have a relatively low planarization degree.

SUMMARY

Embodiments provide a polishing slurry composition that may improve topography of a tungsten film, to reduce metal short circuits and etching defects caused by the topography and to enable a next-generation high integration process.

Also, embodiments provide a slurry composition for polishing tungsten that may be used to polish a tungsten film at a high polishing speed and that may have an excellent planarization degree.

However, the problems to be solved in the present disclosure are not limited to the foregoing problems, and other problems not mentioned herein would be clearly understood by one of ordinary skill in the art from the following description.

According to an aspect, there is provided a polishing slurry composition including at least two types of abrasive particles among first abrasive particles, second abrasive particles, and third abrasive particles, and an oxidizer, wherein a peak-to-valley roughness Rpv decreases when a contact area between the abrasive particles and a tungsten-containing film increases.

The contact area between the abrasive particles and the tungsten-containing film may range from 0.5 to 0.9, and may be calculated by the following equation:

$$A = C_0^{1/3} \cdot \varphi^{-1/3}.$$

Here, A denotes the contact area, $C_0$ denotes a concentration of the abrasive particles in % by weight (wt %), and $\varphi$ denotes a diameter of an abrasive particle in nanometers (nm).

The polishing slurry composition may satisfy a removal ratio of 35% to 70% calculated by the following equation.

$$\text{Removal ratio (\%)} = \frac{Rpv \text{ before polishing} - Rpv \text{ after polishing}}{Rpv \text{ before polishing}} \times 100.$$

When the contact area between the abrasive particles and the tungsten-containing film calculated by Equation 1 is 0.5 or more and 0.7 or less, the removal ratio may be 35% or more and less than 43%. When the contact area exceeds 0.7 and is 0.9 or less, the removal ratio may be 43% or more and 70% or less. The contact area may be calculated by the following equation:

$$A = C_0^{1/3} \cdot \varphi^{-1/3}.$$

Here, A denotes the contact area, $C_0$ denotes a concentration of the abrasive particles in wt %, and $\varphi$ denotes a diameter of an abrasive particle in nm.

The polishing slurry composition may be used to improve topography of the tungsten-containing film.

The first abrasive particles may have a primary particle size of 20 nm or more to less than 45 nm and a secondary particle size of 30 nm or more to less than 100 nm, the second abrasive particles may have a primary particle size of 45 nm or more to less than 130 nm and a secondary particle size of 100 nm or more to less than 180 nm, and the third abrasive particles may have a primary particle size of 130 nm or more to less than 250 nm and a secondary particle size of 180 nm or more to less than 500 nm. In all the abrasive particles, the first abrasive particles may be present in an amount of 10 wt % to 60 wt %, the second abrasive particles may be present in an amount of 10 wt % to 60 wt %, and the third abrasive particles may be present in an amount of 10 wt % to 60 wt %.

The polishing slurry composition may be hydrogen peroxide-free or include less than 1 wt % of hydrogen peroxide.

A peak-to-valley roughness Rpv of a surface of the tungsten-containing film polished using the polishing slurry composition may be 100 nm or less, and a roughness of the surface may be 10 nm or less.

According to another aspect, there is provided a tungsten polishing slurry composition for polishing tungsten, the tungsten polishing slurry composition including at least two types of abrasive particles among first abrasive particles, second abrasive particles, and third abrasive particles, wherein a specific surface area of the abrasive particles satisfies the following conditional expression:

$$20 \text{ m}^2/\text{g} \leq (T_A \times K_A) + (T_B \times K_B) + (T_C \times K_C) \leq 100 \text{ m}^2/\text{g}.$$

In the conditional expression, $T_A$, $T_B$ and $T_C$ denote a specific surface area of the first abrasive particles, a specific surface area of the second abrasive particles, and a specific surface area of the third abrasive particles, respectively, and one of the specific surface areas $T_A$, $T_B$, and $T_C$ has a value of "0." Also, $K_A$, $K_B$ and $K_C$ denote a ratio of an amount of the first abrasive particles to a total amount of the abrasive particles, a ratio of an amount of the second abrasive particles to the total amount of the abrasive particles and a ratio of an amount of the third abrasive particles to the total amount of the abrasive particles, respectively, and $0 \leq K_A < 1$, $0 \leq K_B < 1$, and $0 \leq K_C < 1$ are satisfied.

The first abrasive particles, the second abrasive particles or the third abrasive particles may each have a specific surface area of 10 square meters per gram (m²/g) to 120 m²/g.

The first abrasive particles may have a specific surface area of 70 m²/g to 120 m²/g, the second abrasive particles may have a specific surface area of 25 m²/g to 70 m²/g, and the third abrasive particles may have a specific surface area of 10 m²/g to 25 m²/g.

In all the abrasive particles, the first abrasive particles may be present in an amount of 10 wt % to 70 wt %, the second abrasive particles may be present in an amount of 10 wt % to 70 wt %, and the third abrasive particles may be present in an amount of 10 wt % to 70 wt %.

A component of a portion of each of the abrasive particles may be substituted with a metal ion.

The metal ion may have a tetrahedral coordination. The metal ion may include at least one of iron (Fe), aluminum (Al), arsenic (As), gallium (Ga), boron (B), beryllium (Be), cobalt (Co), chromium (Cr), hafnium (Hf), indium (In), magnesium (Mg), manganese (Mn), nickel (Ni), phosphorus (P), titanium (Ti), vanadium (V), zinc (Zn) and zirconium (Zr).

The abrasive particles may be colloidal silica abrasive particles, the metal ion may be an Fe ion, and a silicon (Si) ion of a portion of a surface of each of the colloidal silica abrasive particles may be substituted with the Fe ion.

A planarization degree of a surface of a tungsten-containing wafer polished using the tungsten polishing slurry composition may be 5% or less.

A peak-to-valley roughness Rpv of a surface of a tungsten-containing wafer polished using the tungsten polishing slurry composition may be 100 nm or less, and a roughness of the surface may be 10 nm or less.

The tungsten polishing slurry composition may be used to improve topography of a tungsten-containing wafer.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
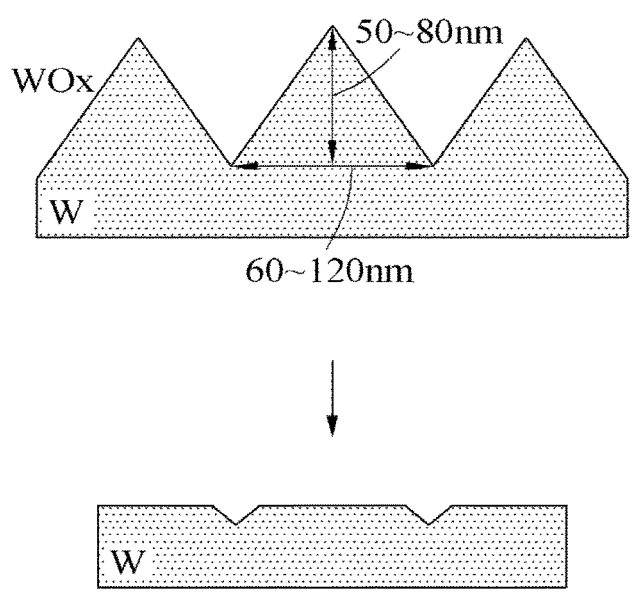
FIG. 1 illustrates uneven portions of a tungsten film before chemical mechanical polishing (CMP) is performed, and a tungsten wafer from which uneven portions are removed after the CMP is performed using a polishing slurry composition according to an embodiment.

Hereinafter, embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the embodiments and thus may be changed depending on a user, the intent of an operator, or a custom. Accordingly, the terms must be defined based on the following overall description of this specification. Like reference numerals present in the drawings refer to the like elements throughout.

It will be understood throughout the whole specification that, unless specified otherwise, when one part "includes" or "comprises" one component, the part does not exclude other components but may further include the other components.

Hereinafter, a polishing slurry composition will be described in detail with reference to embodiments and drawings. However, the present disclosure is not limited to these embodiments and drawings.

According to an embodiment, a polishing slurry composition may include at least two types of abrasive particles among first abrasive particles, second abrasive particles and third abrasive particles, and an oxidizer. When a contact area between the abrasive particles and a tungsten-containing film increases, a peak-to-valley roughness Rpv may decrease.

The polishing slurry composition may be used to improve topography of the tungsten-containing film, because the peak-to-valley roughness Rpv decreases when the contact area between the abrasive particles and the tungsten-containing film increases. The polishing slurry composition may include two or three types of abrasive particles, and thus it is possible to considerably reduce surface defects, for example, an erosion phenomenon, a dishing phenomenon or formation of residues of a metal layer on a surface of an object to be polished.

FIG. 1 illustrates uneven portions of a tungsten film before chemical mechanical polishing (CMP) is performed, and the tungsten film from which the uneven portions are removed after the CMP is performed using a polishing slurry composition according to an embodiment. In a top portion of FIG. 1, viewed from a side, topography of the tungsten film has uneven conical shapes. Unlike a slurry composition for improving topography of tungsten according to a related art, a polishing slurry composition according to an embodiment may include a mixture of two or three types of silica abrasive particles, to remove only topographies of tungsten and avoid waste of tungsten due to excessive polishing as shown in a bottom portion of FIG. 1.

The contact area between the abrasive particles and the tungsten-containing film may range from 0.5 to 0.9, and may be calculated by Equation 1 shown below.

$$A = C_0^{1/3} \cdot \varphi^{-1/3} \qquad \text{[Equation 1]}$$

In Equation 1, A denotes the contact area, $C_0$ denotes a concentration of the abrasive particles in % by weight (wt %), and $\varphi$ denotes a diameter of an abrasive particle in nanometers (nm).

For example, when a contact area between abrasive particles and a tungsten film which is not included in the above range, polishing may not be sufficiently performed and topography of the tungsten film may not be improved.

A peak-to-valley roughness Rpv of a surface of the tungsten-containing film polished using the polishing slurry composition may be 100 nm or less. The peak-to-valley roughness Rpv may be measured with a scanning probe microscope.

The polishing slurry composition may satisfy a removal ratio of 35% to 70% calculated by Equation 2 shown below.

$$\text{Removal ratio (\%)} = \frac{Rpv \text{ before polishing} - Rpv \text{ after polishing}}{Rpv \text{ before polishing}} \times 100 \quad \text{[Equation 2]}$$

When the contact area calculated by Equation 1 is 0.5 or more and 0.7 or less, the removal ratio may range from 35% to less than 43%. When the contact area exceeds 0.7 and is 0.9 or less, the removal ratio may be 43% or more and 70% or less.

A roughness of the surface of the tungsten-containing film polished using the polishing slurry composition may be 10 nm or less. The roughness may be measured with a scanning probe microscope.

The polishing slurry composition may be used to improve topography of the tungsten-containing film. The tungsten-containing film may include, for example, tungsten, tantalum, titanium, ruthenium, hafnium, other refractory metals, nitrides and suicides thereof.

The first abrasive particles may have a primary particle size of 20 nm or more to less than 45 nm and a secondary particle size of 30 nm or more to less than 100 nm. The second abrasive particles may have a primary particle size of 45 nm or more to less than 130 nm and a secondary particle size of 100 nm or more to less than 180 nm. The third abrasive particles may have a primary particle size of 130 nm or more to less than 250 nm and a secondary particle size of 180 nm or more to less than 500 nm.

The first abrasive particles, the second abrasive particles and the third abrasive particles may be prepared by adjusting calcination conditions and/or milling conditions. In an example, a bimodal particle size distribution may be obtained by mixing the first abrasive particles and the second abrasive particles, by mixing the first abrasive particles and the third abrasive particles, or by mixing the second abrasive particles and the third abrasive particles. In another example, a particle size distribution with three peaks may be obtained by mixing all the first abrasive particles, the second abrasive particles and the third abrasive particles. Because relatively large abrasive particles and relatively small abrasive particles may be mixed, the polishing slurry composition may have superior dispersibility and an effect of reducing scratches on a wafer surface may be expected.

In all the abrasive particles, the first abrasive particles may be present in an amount of 10 wt % to 60 wt %, the second abrasive particles may be present in an amount of 10 wt % to 60 wt %, and the third abrasive particles may be present in an amount of 10 wt % to 60 wt %.

As described above, improvement in the topography of the tungsten film is related to the contact area between the abrasive particles and the tungsten-containing film. When the first abrasive particles, the second abrasive particles and the third abrasive particles are mixed within the above ranges to be used, an excellent topography improvement effect may be obtained. The amount of the first abrasive particles, the amount of the second abrasive particles and the amount of the third abrasive particles may be determined based on a mixing ratio to improve dispersion stability by calculating a contact area between each of the abrasive particles and the tungsten-containing film.

The first abrasive particles, the second abrasive particles and the third abrasive particles may independently include at least one of a metal oxide, a metal oxide coated with an organic material or inorganic material, and the metal oxide in a colloidal phase. The metal oxide may include at least one of silica, ceria, zirconia, alumina, titania, barium titania, germania, mangania and magnesia.

The abrasive particles may be present in an amount of 0.5 wt % to 10 wt % in the polishing slurry composition, regardless of types of the abrasive particles, for example, the first abrasive particles, the second abrasive particles and the third abrasive particles. When the amount of the abrasive particles is less than 0.5 wt % in the polishing slurry composition, a planarization rate may decrease due to insufficient polishing of a film to be polished, for example, a tungsten film. When the amount of the abrasive particles exceeds 10 wt %, the abrasive particles may cause, for example, defects or scratches.

The oxidizer may include at least one of hydrogen peroxide, iron (11) nitrate, potassium iodate, potassium permanganate, ammonium chlorite, ammonium chlorate, ammonium iodate, ammonium perborate, ammonium perchlorate, ammonium periodate, tetramethylammonium chlorite, tetramethylammonium chlorate, tetramethylammonium iodate, tetramethylammonium perborate, tetramethylammonium perchlorate, tetramethylammonium periodate, 4-methylmorpholine N-oxide, pyridine-N-oxide and urea hydrogen peroxide. Among these, hydrogen peroxide may desirably be used in view of oxidizing power, dispersion stability of the polishing slurry composition and affordability.

The oxidizer may be present in an amount of 0.005 wt % to 5 wt %, desirably in an amount of 0.05 wt % to 1 wt % in the polishing slurry composition. When the amount of the oxidizer is less than 0.005 wt % in the polishing slurry composition, a polishing speed and an etching speed of tungsten may be reduced. When the amount of the oxidizer exceeds 5 wt %, an oxide film on a tungsten surface may become hard so that polishing may not be smoothly performed and the oxide film may grow to cause corrosion and erosion of tungsten, which may result in inferior topography.

Because the oxidizer has a direct influence on the polishing speed and the etching speed of the tungsten, a concentration of hydrogen peroxide may need to be reduced in the polishing slurry composition in which a quality of a tungsten surface is regarded to be important. Thus, the polishing slurry composition may be hydrogen peroxide-free or include less than 1 wt % of hydrogen peroxide.

The polishing slurry composition may further include a pH adjuster as a material used to prevent corrosion of a metal or abrader and to realize a pH range in which metal is easily oxidized. For example, the pH adjuster may include at least one of an inorganic acid or inorganic acid salt and an organic acid or organic acid salt. The inorganic acid or inorganic acid salt may include at least one of hydrochloric acid, nitric acid, phosphoric acid, sulfuric acid, hydrofluoric acid, bromic acid, iodic acid and salts thereof, and the organic acid or organic acid salt may include at least one of formic acid, malonic acid, maleic acid, oxalic acid, acetic acid, adipic acid, citric acid, propionic acid, fumaric acid, lactic acid, salicylic acid, pimelic acid, benzoic acid, succinic acid, phthalic acid, butyric acid, glutaric acid, glutamic acid, glycolic acid, asparaginic acid, tartaric acid and salts thereof.

Desirably, pH of the polishing slurry composition may be adjusted to achieve dispersion stability and an appropriate polishing speed based on the abrasive particles. The pH of the polishing slurry composition may be in a range from 1 to 5, desirably in an acidic range of 2 to 4.

The polishing slurry composition may be used to polish tungsten with a thickness of 10 angstroms per minute (Å/min) to 1,000 Å/min.

A peak-to-valley roughness Rpv of a surface of a tungsten-containing wafer polished using the polishing slurry composition may be 100 nm or less, and a roughness of the surface may be 10 nm or less. The peak-to-valley roughness Rpv may be measured with a scanning probe microscope.

The polishing slurry composition may be prepared by mixing two or three types of abrasive particles, and thus it is possible to improve a yield affected by metal short circuits and etching defects caused by topography of a film during polishing of tungsten, and possible to enable a next-generation high integration process. Also, because only topographies of tungsten are removed it is possible to prevent tungsten from being wasted due to excessive polishing, and possible to considerably reduce surface defects, for example, an erosion phenomenon, a dishing phenomenon or formation of residues of a metal layer on a surface of an object to be polished.

Hereinafter, the present disclosure will be described in detail with reference to examples and comparative examples. However, the technical idea of the present disclosure is not limited or restricted to the examples.

Comparative Example 1-1

A polishing slurry composition was prepared by mixing 3.5 wt % of third silica abrasive particles and 0.5 wt % of hydrogen peroxide. pH of the polishing slurry composition was adjusted to 2.5 with nitric acid.

Comparative Example 1-2

A polishing slurry composition was prepared in the same manner as in Comparative Example 1-1 except that second silica abrasive particles were used.

Example 1-1

A polishing slurry composition was prepared in the same manner as in Comparative Example 1-1 except that a mixture of two types of abrasive particles, 50% of the second silica abrasive particles and 50% of the third silica abrasive particles, was used.

Example 1-2

A polishing slurry composition was prepared in the same manner as in Comparative Example 1-1 except that a mixture of two types of abrasive particles, 50% of the first silica abrasive particles and 50% of the second silica abrasive particles, was used.

Example 1-3

A polishing slurry composition was prepared in the same manner as in Comparative Example 1-1 except that a mixture of three types of abrasive particles, 20% of the first silica abrasive particles, 40% of the second silica abrasive particles and 40% of the third silica abrasive particles, was used.

Example 1-4

A polishing slurry composition was prepared in the same manner as in Comparative Example 1-1 except that a mixture of three types of abrasive particles, 40% of the first silica abrasive particles, 20% of the second silica abrasive particles and 40% of the third silica abrasive particles was used.

Example 1-5

A polishing slurry composition was prepared in the same manner as in Comparative Example 1-1 except that a mixture of three types of abrasive particles, 40% of the first silica abrasive particles, 40% of the second silica abrasive particles and 20% of the third silica abrasive particles, was used.

Example 1-6

A polishing slurry composition was prepared in the same manner as in Comparative Example 1-1 except that a mixture of three types of abrasive particles, 33.33% of the first silica abrasive particles, 33.33% of the second silica abrasive particles and 33.33% of the third silica abrasive particles, was used.

Tungsten wafers were polished using the polishing slurry compositions of Comparative Examples 1-1 and 1-2 and Examples 1-1 to 1-6 under the following polishing conditions.

[Polishing Conditions]
1. Polishing equipment: CETR CP-4
2. Wafer: 6 cm×6 cm tungsten wafer
3. Platen pressure: 4 psi
4. Spindle speed: 69 rpm
5. Platen speed: 70 rpm
6. Flow rate: 100 ml/min
7. Slurry solid content: 3.5 wt %

Table 1 shows a contact area of a tungsten topographic surface (*contact area between the abrasive particles and a tungsten wafer polished using the polishing slurry compositions of Comparative Examples 1-1 and 1-2 and Examples 1-1 to 1-6, values of a peak-to-valley roughness Rpv after polishing, a difference ΔRpv between the values of the peak-to-valley roughness Rpv after polishing and a value of a peak-to-valley roughness Rpv before polishing (that is, an initial value of the peak-to-valley roughness Rpv), and a removal ratio with respect to the initial value of the peak-to-valley roughness Rpv. The initial value of the peak-to-valley roughness Rpv is 130 nm.

TABLE 1

| No. | Contact area | Rpv (nm) | ΔRpv (nm) | Removal ratio (%) |
|---|---|---|---|---|
| Comparative Example 1-1 | 0.26 | 110 | 20 | 15.4 |
| Comparative Example 1-2 | 0.38 | 87 | 43 | 33.0 |
| Example 1-1 | 0.50 | 79 | 51 | 39.2 |
| Example 1-2 | 0.69 | 77 | 53 | 40.8 |
| Example 1-3 | 0.76 | 70 | 60 | 46.2 |
| Example 1-4 | 0.78 | 68 | 62 | 47.7 |
| Example 1-5 | 0.80 | 63 | 67 | 52.3 |
| Example 1-6 | 0.79 | 62 | 68 | 51.5 |

From Table 1, it can be found that among all contact area values for the polishing slurry compositions of Comparative Examples 1-1 and 1-2 and Examples 1-1 to 1-6, the polishing slurry compositions of Examples 1-3 to 1-6 in which three types of silica abrasive particles were mixed have relatively high contact area values, and the polishing slurry compositions of Examples 1-1 and 1-2 in which two types of silica abrasive particles were mixed have higher contact area values than those of the polishing slurry compositions of Comparative Examples 1-1 and 1-2 in which a single type of silica abrasive particles were used, and that the peak-to-valley roughness Rpv decreases when the contact area increases. Also, it can be found that the polishing slurry compositions of Examples 1-3 to 1-6 have relatively high removal ratios and the polishing slurry compositions of Examples 1-1 and 1-2 have higher removal ratios than the polishing slurry compositions of Comparative Examples 1-1 and 1-2. Thus, it can be found that the polishing slurry compositions of Examples 1-3 to 1-6 having the relatively high contact area values and the relatively high removal ratios are advantageous for improvement in tungsten topography. This is because a contact area of a polishing slurry composition including a mixture of three types of silica abrasive particles increases in comparison to a polishing slurry composition including a mixture of two types of silica abrasive particles during polishing of tungsten. Thus, topography of tungsten polished using a polishing slurry composition including a mixture of two or three types of silica abrasive particles may be improved in comparison to topography of tungsten polished using a polishing slurry composition including a single type of silica abrasive particles. In particular, it can be found that a polishing slurry composition including a mixture of three types of silica abrasive particles are superior for improving tungsten topography to a polishing slurry composition including a mixture of two types of silica abrasive particles. In other words, the peak-to-valley roughness Rpv decreases based on an increase in the contact area, which may lead to superior improvement in topography.

According to an embodiment, a tungsten polishing slurry composition for polishing tungsten may include at least two types of abrasive particles among first abrasive particles, second abrasive particles and third abrasive particles. A specific surface area of the abrasive particles may satisfy Conditional expression 1 shown below.

$$20 \text{ m}^2/\text{g} \leq (T_A \times K_A) + (T_B \times K_B) + (T_C \times K_C) \leq 100 \text{ m}^2/\text{g} \quad \text{[Conditional expression 1]}$$

In Conditional expression 1, $T_A$ denotes a specific surface area of the first abrasive particles, $T_B$ denotes a specific surface area of the second abrasive particles, and $T_C$ denotes a specific surface area of the third abrasive particles, and one of the specific surface areas $T_A$, $T_B$, and $T_C$ may have a value of "0." Also, $K_A$ denotes a ratio of an amount of the first abrasive particles to a total amount of abrasive particles, $K_B$ denotes a ratio of an amount of the second abrasive particles to the total amount of abrasive particles and $K_C$ denotes a ratio of an amount of the third abrasive particles to the total amount of abrasive particles, and $0 \leq K_A < 1$, $0 \leq K_B < 1$, and $0 \leq K_C < 1$ are satisfied.

One of the specific surface areas $T_A$, $T_B$, and $T_C$ may have a value of "0," which may indicate that a specific surface area of one of a first abrasive particle, a second abrasive particle and a third abrasive particle may have a value of "0." In other words, two types of abrasive particles may be determined to be added.

A sum of the ratios $K_A$, $K_B$ and $K_C$ may be "1" and one of the ratios $K_A$, $K_B$ and $K_C$ may have a value of "0." In other words, a ratio of an amount of one of a first abrasive particle, a second abrasive particle and a third abrasive particle to the total amount of abrasive particles may be "0," which may indicate that only two types of abrasive particles are added.

A sum of a product of the specific surface area $T_A$ and the ratio $K_A$, a product of the specific surface area $T_B$ and the ratio $K_B$ and a product of the specific surface area $T_C$ and the ratio $K_C$ may have a value of 20 square meters per gram (m²/g) to 100 m²/g. When the sum is less than 20 m²/g, scratches may occur despite an increase in a polishing speed during a polishing process. When the sum is greater than 100 m²/g, a sufficiently high polishing speed may not be obtained.

By using the tungsten polishing slurry composition, a tungsten film may be polished at a relatively high polishing speed, to reduce a polishing process time, and an excellent planarization degree may be obtained. Also, the tungsten polishing slurry composition may include a mixture of at least two types of abrasive particles, and accordingly surface defects, for example, an erosion phenomenon, a dishing phenomenon or formation of residues of a metal layer on a surface of an object to be polished, may be considerably reduced. Thus, it is possible to reduce metal short circuits and etching defects and to enable a next-generation high integration process.

In the present disclosure, "at least two types of abrasive particles" refer to two or three types of abrasive particles, however, there is no limitation thereto. For example, at least four types of abrasive particles may be provided. In an example, two types of abrasive particles prepared with different specific surface areas may be mixed by adjusting calcination conditions and/or milling conditions, to obtain a bimodal particle size distribution. In another example, three types of abrasive particles prepared with different specific surface areas may be mixed, to obtain a particle size distribution with three peaks.

The first abrasive particles may have a primary particle size of 20 nm or more to less than 45 nm, the second abrasive particles may have a primary particle size of 45 nm or more to less than 130 nm, and the third abrasive particles may have a primary particle size of 130 nm or more to less than 250 nm.

Also, the first abrasive particles may have a secondary particle size of 30 nm or more to less than 100 nm, the second abrasive particles may have a secondary particle size of 100 nm or more to less than 250 nm, and the third abrasive particles may have a secondary particle size of 250 nm or more to less than 500 nm.

The first abrasive particles, the second abrasive particles and the third abrasive particles may be prepared by adjusting calcination conditions and/or milling conditions. In an example, a bimodal particle size distribution may be obtained by mixing the first abrasive particles and the second abrasive particles, by mixing the first abrasive particles and the third abrasive particles, or by mixing the second abrasive particles and the third abrasive particles. In another example, a particle size distribution with three peaks may be obtained by mixing all the first abrasive particles, the second abrasive particles and the third abrasive particles. Because relatively large abrasive particles and relatively small abrasive particles may be mixed, the polishing slurry composition may have superior dispersibility and an effect of reducing scratches on a wafer surface may be expected.

The first abrasive particles, the second abrasive particles and the third abrasive particles may each have a specific surface area of 10 m²/g to 120 m²/g. When the specific surface area is less than 10 m²/g, scratches may occur during a polishing process. When the specific surface area is greater than 120 m²/g, it may be difficult to obtain an excellent planarization degree.

For example, the first abrasive particles may have a specific surface area of 70 m²/g to 120 m²/g, the second abrasive particles may have a specific surface area of 25 m²/g to 70 m²/g, and the third abrasive particles may have a specific surface area of 10 m²/g to 25 m²/g, however, there is no limitation thereto. For example, two or three types of abrasive particles with a specific surface area of 10 m²/g to 120 m²/g may be mixed.

For example, when at least two types of abrasive particles are mixed, that is, when abrasive particles with a relatively large specific surface area and abrasive particles with a relatively small specific surface area are mixed, a polishing speed may be higher 1.5 times than a polishing speed when a single type of abrasive particles are used. In this example, excellent dispersibility may be obtained, and an excellent planarization degree of a wafer surface may be expected in comparison to when the single type of abrasive particles is used.

In all the abrasive particles, the first abrasive particles may be present in an amount of 10 wt % to 70 wt % the second abrasive particles may be present in an amount of 10 wt % to 70 wt %, and the third abrasive particles may be present in an amount of 10 wt % to 70 wt %. When the amount of the abrasive particles is less than 10 wt %, a polishing speed may not be sufficiently high in the polishing process. When the amount of the abrasive particles is greater than 70 wt %, scratches may occur during the polishing process.

Polishing of a tungsten-containing wafer and improvement in topography of the tungsten-containing wafer are related to a contact area between the abrasive particles and the tungsten-containing wafer. When the first abrasive particles, the second abrasive particles and the third abrasive particles are mixed within the above ranges to be used, an excellent topography improvement effect may be obtained. The amount of the first abrasive particles, the amount of the second abrasive particles and the amount of the third abrasive particles may be determined based on a mixing ratio to improve dispersion stability by calculating a contact area between each of the abrasive particles and the tungsten-containing wafer.

The at least two types of abrasive particles may independently include at least one of a metal oxide, a metal oxide coated with an organic material or inorganic material, and the metal oxide in a colloidal phase. The metal oxide may include at least one of silica, ceria, zirconia, alumina, titania, barium titania, germania, mangania and magnesia.

The at least two types of abrasive particles may include, for example, an abrasive particle that is partially substituted with a metal ion (hereinafter, referred to as a "metal-substituted abrasive particle"). At least one type of abrasive particles among the first abrasive particles, the second abrasive particles and the third abrasive particles may be metal-substituted abrasive particles. For example, a portion of an abrasive particle corresponding to 30% of a length from a surface of the abrasive particle to a center of the abrasive particle may be substituted with a metal ion.

The metal ion may have a tetrahedral coordination. The metal ion may include at least one of iron (Fe), aluminum (Al), arsenic (As), gallium (Ga), boron (B), beryllium (Be), cobalt (Co), chromium (Cr), hafnium (Hf), indium (In), magnesium (Mg), manganese (Mn), nickel (Ni), phosphorus (P), titanium (Ti), vanadium (V), zinc (Zn) and zirconium (Zr).

For example, the at least two types of abrasive particles may be colloidal silica abrasive particles, and the metal ion may be an Fe ion. In this example, a silicon (Si) ion of a portion of a surface of each of the colloidal silica abrasive particles may be substituted with the Fe ion.

The metal-substituted abrasive particles may have a zeta-potential of −1 millivolts (mV) to −100 mV in a pH range of 1 to 12, and desirably have a zeta-potential of −10 mV to −70 mV in a pH range of 1 to 6. A relatively high absolute value of the zeta potential may be obtained in an acidic pH range, and thus it is possible to realize a relatively high dispersion stability and excellent polishing power.

A method of manufacturing the metal-substituted abrasive particles may include preparing a mixture by mixing abrasive particles with either a metal salt or a metal ion compound or both, and synthesizing the mixture in a hydrothermal synthesis condition. Based on a characteristic of a metal ion having a tetrahedral coordination in an alkaline condition, a metal oxide atom ion of abrasive particles may be substituted with a metal ion.

The metal salt may include a salt of at least one of Fe, Al, As, Ga, B, Be, Co, Cr, Hf, In, Mg, Mn, Ni, P, Ti, V, Zn and Zr, As a salt of Fe, a material including at least one of iron nitrate (for example, ferric nitrate ($Fe(NO_3)_3$)), iron sulfate (for example, ferric sulfate ($Fe_2(SO_4)_3$)), iron oxide (for example, ferric oxide ($Fe_2O_3$)) and iron chloride (for example, ferric chloride ($FeCl_3$)) may be used. For example, iron nitrate may be dissociated from water to provide an Fe ion, for example, $Fe^{2+}$ or $Fe^3$.

The metal ion compound may include at least one of sodium nitrate, lithium nitrate, potassium nitrate, sodium hydroxide, lithium hydroxide, potassium hydroxide, sodium sulfate, lithium sulfate, potassium sulfate, sodium chloride, lithium chloride, potassium chloride, sodium carbonate, lithium carbonate, and potassium carbonate.

The metal salt may be present in an amount of 0.001 parts by weight to 20 parts by weight based on 100 parts by weight of the abrasive particles. When the amount of the metal salt is less than 0.001 parts by weight, dispersion stability may decrease due to an insufficient zeta-potential. When the amount of the metal salt exceeds 20 parts by weight, contamination may be caused by an unreacted metal salt.

The metal ion compound may be present in an amount of 0.001 parts by weight to 20 parts by weight based on 100 parts by weight of the abrasive particles. When the amount of the metal ion compound is less than 0.001 parts by weight, substitution with a metal ion may not be smoothly performed. When the amount of the metal ion compound exceeds 20 parts by weight, contamination may occur and dispersion stability may decrease.

To efficiently perform a metal substitution reaction, a hydrothermal synthesis may be performed using the mixture at a temperature of 100° C. to 300° C. for a period of time of 0.5 to 72 hours.

Before the hydrothermal synthesis is performed, pH of the mixture may be adjusted to range from 9 to 12. When the hydrothermal synthesis is completed, the pH may be adjusted to range from 1 to 5. A pH adjuster may include, for example, an acidic material or basic material without a limit. For example, at least one of potassium hydroxide, sodium hydroxide, ammonia, an ammonia derivative, hydrochloric acid, nitric acid, sulfuric acid, acetic acid, phosphoric acid, boric acid, amino acid, citric acid, tartaric acid, formic acid, maleic acid and oxalic acid may be used as a pH adjuster, and an amount of the pH adjuster to adjust desired pH may be used to manufacture the metal-substituted abrasive particles.

Because the metal ion is not simply bonded to a surface of each of the metal-substituted abrasive particles and has a tetrahedral coordination in an alkaline condition, a surface of abrasive particles may be reformed by substituting a metal oxide atom ion of the surface with the metal ion under the hydrothermal synthesis condition. Thus, relatively high dispersion stability may be obtained in an acidic condition. Also, the metal ion for the substitution may be used to realize a higher polishing characteristic to easily polish a tungsten film by promoting oxidation of a metal film.

A shape of each of the first abrasive particles, the second abrasive particles and the third abrasive particles may include, for example, at least one of a globular shape, a square shape, a needle shape and a plate shape.

The tungsten polishing slurry composition may further include at least one oxidizer. The oxidizer may include at least one of hydrogen peroxide, iron (II) nitrate, potassium iodate, potassium permanganate, ammonium chlorite, ammonium chlorate, ammonium iodate, ammonium perborate, ammonium perchlorate, ammonium periodate, tetramethylammonium chlorite, tetramethylammonium chlorate, tetramethylammonium iodate, tetramethylammonium perborate, tetramethylammonium perchlorate, tetramethylammonium periodate, 4-methylmorpholine N-oxide pyridine-N-oxide and urea hydrogen peroxide. Among these, hydrogen peroxide may desirably be used in view of oxidizing power, dispersion stability of the tungsten polishing slurry composition and affordability.

The oxidizer may be present in an amount of 0.005 wt % to 5 wt %, desirably in an amount of 0.05 wt % to 1 wt % in the tungsten polishing slurry composition. When the amount of the oxidizer is less than 0.005 wt % in the tungsten polishing slurry composition, a polishing speed and an etching speed of tungsten may be reduced. When the amount of the oxidizer exceeds 5 wt %, an oxide film on a tungsten surface may become hard so that polishing may not be smoothly performed and the oxide film may grow to cause corrosion and erosion of tungsten, which may result in inferior topography. Because the oxidizer has a direct influence on the polishing speed and the etching speed of the tungsten, a concentration of hydrogen peroxide may need to be reduced in the tungsten polishing slurry composition in which a quality of a tungsten surface is regarded to be important.

The tungsten polishing slurry composition may further include a pH adjuster as a material used to prevent corrosion of a metal or abrader and to realize a pH range in which metal is easily oxidized. For example, the pH adjuster may include at least one of an inorganic acid or inorganic acid salt and an organic acid or organic acid salt. The inorganic acid or inorganic acid salt may include at least one of hydrochloric acid, nitric acid, phosphoric acid, sulfuric acid, hydrofluoric acid, bromic acid, iodic acid and salts thereof, and the organic acid or organic acid salt may include at least one of formic acid, malonic acid, maleic acid, oxalic acid, acetic acid, adipic acid, citric acid, propionic acid, fumaric acid, lactic acid, salicylic acid, pimelic acid, benzoic acid, succinic acid, phthalic acid, butyric acid, glutaric acid, glutamic acid, glycolic acid, asparaginic acid, tartaric acid and salts thereof.

The tungsten polishing slurry composition may be used to polish tungsten with a thickness of 1,000 Å/min to 2,200 Å/min.

A planarization degree of a surface of a tungsten-containing wafer polished using the tungsten polishing slurry composition may be 5% or less. The tungsten-containing wafer may include, for example, tungsten, tantalum, titanium, ruthenium, hafnium, other refractory metals, nitrides and suicides thereof.

A peak-to-valley roughness Rpv of the surface of the tungsten-containing wafer polished using the tungsten polishing slurry composition may be 100 nm or less, and a roughness of the surface may be 10 nm or less. The peak-to-valley roughness Rpv may be measured with a scanning probe microscope.

The tungsten polishing slurry composition may be used to improve topography of a tungsten-containing wafer.

Desirably, pH of the tungsten polishing slurry composition may be adjusted to achieve dispersion stability and an appropriate polishing speed based on the abrasive particles. The pH of the tungsten polishing slurry composition may be in a range from 1 to 12, desirably in an acidic range of 1 to 6.

Hereinafter, the present disclosure will be described in detail with reference to examples and comparative examples. However, the technical idea of the present disclosure is not limited or restricted to the examples.

Example 2-1

A tungsten polishing slurry composition with pH of 2.5 was prepared by adding 3 wt % of a mixture of two types of abrasive particles, 50% of first colloidal silica abrasive particles and 50% of second colloidal silica abrasive particles, with a total specific surface area of 69.9089 $m^2/g$, 0.5 wt % of hydrogen peroxide as an oxidizer, 0.1 wt % of malonic acid as a reaction inhibitor, and nitric acid as a pH adjuster. Abrasive particles manufactured by Fuso Chemical Co., Ltd. were used.

Example 2-2

A tungsten polishing slurry composition was prepared in the same manner as in Example 2-1 except that a mixture of two types of abrasive particles, 50% of the first colloidal silica abrasive particles and 50% of third colloidal silica abrasive particles, with a total specific surface area of 55.2498 $m^2/g$ was used.

Example 2-3

A tungsten polishing slurry composition was prepared in the same manner as in Example 2-1 except that a mixture of two types of abrasive particles, 50% of the second colloidal silica abrasive particles and 50% of the third colloidal silica abrasive particles, with a total specific surface area of 29.4898 $m^2/g$ was used.

Example 2-4

A tungsten polishing slurry composition was prepared in the same manner as in Example 2-1 except that a mixture of three types of abrasive particles, 40% of the first colloidal silica abrasive particles, 40% of the second colloidal silica abrasive particles and 20% of the third colloidal silica abrasive particles, with a total specific surface area of 58.8933 $m^2/g$ was used.

Example 2-5

A tungsten polishing slurry composition was prepared in the same manner as in Example 2-1 except that a mixture of three types of abrasive particles, 40% of the first colloidal silica abrasive particles, 20% of the second colloidal silica abrasive particles and 40% of the third colloidal silica abrasive particles, with a total specific surface area of 53.0296 m$^2$/g was used.

Example 2-6

A tungsten polishing slurry composition was prepared in the same manner as in Example 2-1 except that a mixture of three types of abrasive particles, 20% of the first colloidal silica abrasive particles, 40% of the second colloidal silica abrasive particles and 40% of the third colloidal silica abrasive particles, with a total specific surface area of 42.7256 m$^2$/g was used.

Example 2-7

A tungsten polishing slurry composition was prepared in the same manner as in Example 2-1 except that a mixture of three types of abrasive particles, 40% of the first colloidal silica abrasive particles, 30% of the second colloidal silica abrasive particles and 30% of the third colloidal silica abrasive particles, with a total specific surface area of 55.9614 m$^2$/g was used.

Example 2-8

A tungsten polishing slurry composition was prepared in the same manner as in Example 2-1 except that a mixture of three types of abrasive particles, 30% of the first colloidal silica abrasive particles, 40% of the second colloidal silica abrasive particles and 30% of the third colloidal silica abrasive particles, with a total specific surface area of 50.8094 m$^2$/g was used.

Example 2-9

A tungsten polishing slurry composition was prepared in the same manner as in Example 2-1 except that a mixture of three types of abrasive particles, 30% of the first colloidal silica abrasive particles, 30% of the second colloidal silica abrasive particles and 40% of the third colloidal silica abrasive particles, with a total specific surface area of 47.8776 m$^2$/g was used.

Example 2-10

A tungsten polishing slurry composition was prepared in the same manner as in Example 2-1 except that a mixture of three types of abrasive particles, 33% of the first colloidal silica abrasive particles, 33% of the second colloidal silica abrasive particles and 34% of the third colloidal silica abrasive particles, with a total specific surface area of 51.0340 m$^2$/g was used.

Example 2-11

Colloidal silica abrasive particles substituted with an Fe ion (hereinafter, referred to as "Fe-substituted colloidal silica abrasive particles") were used as colloidal silica abrasive particles. The Fe-substituted colloidal silica abrasive particles were manufactured by preparing a mixed solution of 5 wt % of colloidal silica abrasive particles, 0.17 wt % of iron nitrate (for example, Fe(NO$_3$)) and 0.484 wt % of sodium nitrate (NaNO$_3$), and by adjusting the mixed solution to pH 11 using sodium hydroxide (NaOH), by inserting the mixed solution that contains the colloidal silica abrasive particles and that have adjusted pH in a hydrothermal reactor, and by performing a hydrothermal reaction at 140° C. for 24 hours.

Figure 2:
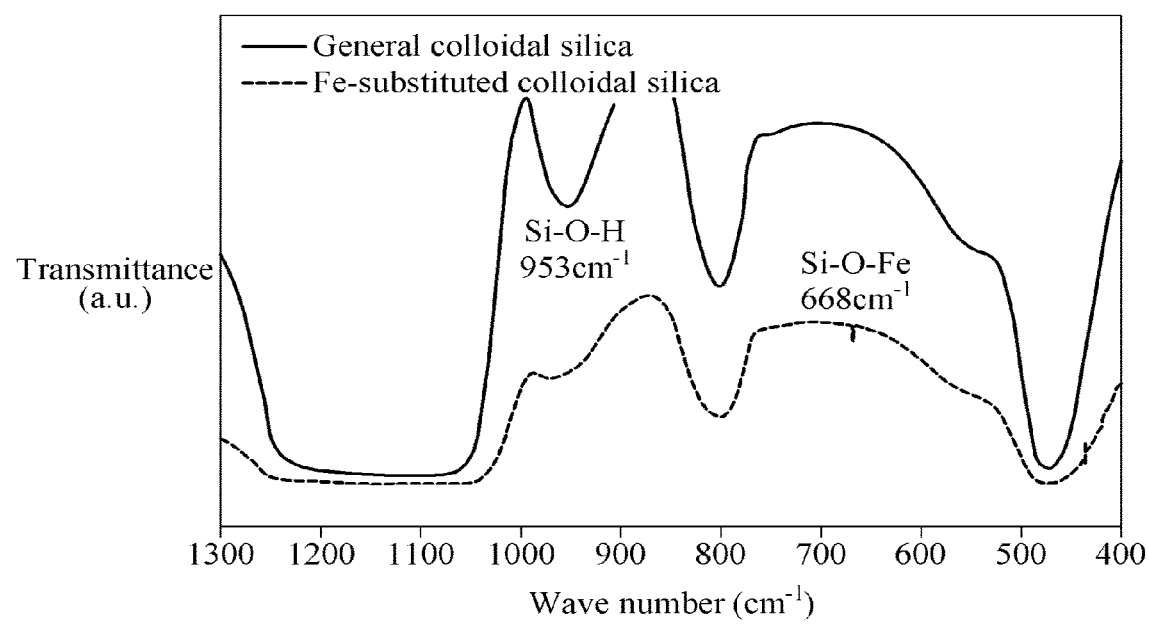
FIG. 2 is a graph of a Fourier-transform infrared spectroscopy (FT-IR) analysis result of colloidal silica abrasive particles substituted with an Fe ion according to an embodiment and general colloidal silica abrasive particles.

To verify whether Fe substitution of the Fe-substituted colloidal silica abrasive particles is properly performed, the Fe-substituted colloidal silica abrasive particles were centrifuged, a particle cake was dried at 110° C. for 24 hours, potassium bromide (KBr) was mixed with the dried particle cake to obtain a pellet, and an infrared absorption spectrum was measured using an infrared spectrometer. FIG. 2 is a graph of a Fourier-transform infrared spectroscopy (FT-IR) analysis result of Fe-substituted colloidal silica abrasive particles according to an embodiment and general colloidal silica abrasive particles. In the graph, a horizontal axis represents a wave number, and a vertical axis represents a transmittance. In FIG. 2, a Si—O—Fe bonding peak is found at 668 reciprocal centimeters (cm$^{-1}$). By analyzing the graph, the Fe substitution is determined to be properly performed.

A tungsten polishing slurry composition was prepared in the same manner as in Example 2-1 except that a mixture of three types of abrasive particles, 40% of first Fe-substituted colloidal silica abrasive particles, 20% of second Fe-substituted colloidal silica abrasive particles and 40% of third Fe-substituted colloidal silica abrasive particles, with a total specific surface area of 58.8933 m$^2$/g was used.

Example 2-12

A tungsten polishing slurry composition was prepared in the same manner as in Example 2-1 except that a mixture of three types of abrasive particles, 30% of the first Fe-substituted colloidal silica abrasive particles, 40% of the second Fe-substituted colloidal silica abrasive particles and 30% of the third Fe-substituted colloidal silica abrasive particles, with a total specific surface area of 50.8094 m$^2$/g was used.

Comparative Example 2-1

A polishing slurry composition was prepared in the same manner as Example 2-1 except that first colloidal silica abrasive particles with a total specific surface area of 95.6689 m$^2$/g were used.

Comparative Example 2-2

A polishing slurry composition was prepared in the same manner as Example 2-1 except that second colloidal silica abrasive particles with a total specific surface area of 44.1489 m$^2$/g were used.

Comparative Example 2-3

A polishing slurry composition was prepared in the same manner as Example 2-1 except that third colloidal silica abrasive particles with a total specific surface area of 14.8307 m$^2$/g were used.

Tungsten wafers were polished using the tungsten polishing slurry compositions of Examples 2-1 to 2-12 and the polishing slurry compositions of Comparative Examples 2-1 to 2-3 under the following polishing conditions.

[Polishing Conditions]
1. Polishing equipment: CETR CP-4 manufactured by Bruker Corporation
2. Wafer: 6 cm×6 cm tungsten wafer
3. Platen pressure: 3 psi 4. Spindle speed: 69 rpm
5. Platen speed: 70 rpm
6. Flow rate: 100 ml/min
7. Slurry solid content: 3 wt %

Table 2 shows an amount of abrasive particles included in each of the tungsten polishing slurry compositions of Examples 2-1 to 2-12 and the polishing slurry compositions of Comparative Examples 2-1 to 2-3, a specific surface area, and a planarization degree and a tungsten polishing rate of a tungsten wafer polished using each of the tungsten polishing slurry compositions of Examples 2-1 to 2-12 and the polishing slurry compositions of Comparative Examples 2-1 to 2-3.

TABLE 2

| No. | First abrasive particles (%) | Second abrasive particles (%) | Third abrasive particles (%) | Specific surface area (m²/g) | Tungsten polishing rate (Å/min) | Planarization degree |
|---|---|---|---|---|---|---|
| Example 2-1 | 50 | 50 | 0 | 69.9089 | 647 | 4.67 |
| Example 2-2 | 50 | 0 | 50 | 55.2498 | 783 | 4.86 |
| Example 2-3 | 0 | 50 | 50 | 29.4898 | 809 | 4.99 |
| Example 2-4 | 40 | 40 | 20 | 58.8933 | 775 | 3.13 |
| Example 2-5 | 40 | 20 | 40 | 53.0296 | 847 | 3.56 |
| Example 2-6 | 20 | 40 | 40 | 42.7256 | 891 | 3.69 |
| Example 2-7 | 40 | 30 | 30 | 55.9614 | 772 | 2.54 |
| Example 2-8 | 30 | 40 | 30 | 50.8094 | 874 | 2.73 |
| Example 2-9 | 30 | 30 | 40 | 47.8776 | 933 | 2.97 |
| Example 2-10 | 33 | 33 | 34 | 51.0340 | 943 | 2.59 |
| Example 2-11 | 40 | 40 | 20 | 58.8933 | 1571 | 4.13 |
| Example 2-12 | 30 | 40 | 30 | 50.8094 | 1759 | 3.79 |
| Comparative Example 2-1 | 100 | 0 | 0 | 95.6689 | 334 | 6.94 |
| Comparative Example 2-2 | 0 | 100 | 0 | 44.1489 | 421 | 7.15 |
| Comparative Example 2-3 | 0 | 0 | 100 | 14.8307 | 540 | 7.89 |

From Table 2, it can be found that the tungsten polishing slurry compositions of Examples 2-1 to 2-12 including at least two types of abrasive particles and having a specific surface area of 20 m²/g or more to 70 m²/g or less have higher tungsten polishing rates than the polishing slurry compositions of Comparative Examples 2-1 to 2-3 including a single type of abrasive particles, and have a planarization degree of 5% or less, that is, an excellent planarization degree. In particular, the tungsten polishing slurry compositions of Examples 2-11 and 2-12 prepared using three types of Fe-substituted silica abrasive particles have relatively high tungsten polishing rates.

Thus, when a tungsten polishing slurry composition including a mixture of two or three types of colloidal silica abrasive particles is used, a high tungsten polishing rate may be obtained and a planarization degree may be improved, in comparison to when a polishing slurry composition including a single type of colloidal silica abrasive particles is used.

According to embodiment, a polishing slurry composition may be used to improve topography of a tungsten-containing wafer, because a peak-to-valley roughness decreases when a contact area between abrasive particles and the tungsten-containing film increases. The polishing slurry composition may include two or three types of abrasive particles, to considerably reduce surface defects, for example, an erosion phenomenon, a dishing phenomenon or formation of residues of a metal layer on a surface of an object to be polished. Thus, it is possible to reduce metal short circuits and etching defects and to enable a next-generation high integration process.

Also, according to embodiments, by using a tungsten polishing slurry composition, a tungsten film may be polished at a relatively high polishing speed, to reduce a polishing process time, and an excellent planarization degree may be obtained. Also, surface defects, for example, an erosion phenomenon, a dishing phenomenon or formation of residues of a metal layer on a surface of an object to be polished, may be considerably reduced. Thus, it is possible to reduce metal short circuits and etching defects and to enable a next-generation high integration process.

Although a few embodiments of the present disclosure have been shown and described, the present disclosure is not limited to the described embodiments. Instead, it would be appreciated by those skilled in the art that changes may be made to these embodiments without departing from the principles and spirit of the present disclosure, the scope of which is defined by the claims and their equivalents.

What is claimed is:

1. A polishing slurry composition comprising:
at least two types of abrasive particles among first abrasive particles, second abrasive particles, and third abrasive particles; and
an oxidizer,
wherein a peak-to-valley roughness Rpv decreases when a contact area between the abrasive particles and a tungsten-containing film increases,
wherein the contact area between the abrasive particles and the tungsten-containing film ranges from 0.5 to 0.9, and is calculated by the following equation:

$$A = C_0^{1/3} s - \varphi^{-1/3}$$

wherein A denotes the contact area, $C_0$ denotes a concentration of the abrasive particles in % by weight (wt %), and $\varphi$ denotes a diameter of an abrasive particle in nanometers (nm),
wherein the polishing slurry composition satisfies a removal ratio of 35% to 70% calculated by the following equation:

$$\text{Removal ration (\%)} = \frac{Rpv \text{ before polishing} - Rpv \text{ after polishing}}{Rpv \text{ before polishing}} \times 100;$$

and
wherein when the contact area between the abrasive particles and the tungsten-containing film is 0.5 or more and 0.7 or less, the removal ratio ranges from 35% or more and less than 43%, when the contact area between the abrasive particles and the tungsten-containing film exceeds 0.7 and is 0.9 or less, the removal ratio is 43% or more and 70% or less.

2. The polishing slurry composition of claim 1, wherein the polishing slurry composition is used to improve topography of the tungsten-containing film.

3. The polishing slurry composition of claim 1, wherein the first abrasive particles have a primary particle size of 20 nm or more to less than 45 nm and a secondary particle size of 30 nm or more to less than 100 nm, the second abrasive particles have a primary particle size of 45 nm or more to less than 130 nm and a secondary particle size of 100 nm or more to less than 180 nm, the third abrasive particles have a primary particle size of 130 nm or more to less than 250 nm and a secondary particle size of 180 nm or more to less than 500 nm, the first abrasive particles are present in an amount of 10 wt % to 60 wt % in all the abrasive particles, the second abrasive particles are present in an amount of 10 wt % to 60 wt % in all the abrasive particles, and the third abrasive particles are present in an amount of 10 wt % to 60 wt %/o in all the abrasive particles.

4. The polishing slurry composition of claim 1, wherein the polishing slurry composition is hydrogen peroxide-free or comprises less than 1 wt % of hydrogen peroxide.

5. The polishing slurry composition of claim 1, wherein a peak-to-valley roughness Rpv of a surface of a tungsten-containing film polished using the polishing slurry composition is 100 nm or less, and a roughness of the surface is 10 nm or less.

6. A tungsten polishing slurry composition for polishing tungsten, the tungsten polishing slurry composition comprising:

at least two types of abrasive particles among first abrasive particles, second abrasive particles, and third abrasive particles, wherein a specific surface area of the abrasive particles satisfies the following conditional expression:

$$20 \ m^2/g \leq (T_A \times K_A) + (T_B \times K_B) + (T_C \times K_C) \leq 100 \ m^2/g,$$

wherein $T_A$, $T_B$ and $T_C$ denote a specific surface area of the first abrasive particles, a specific surface area of the second abrasive particles, and a specific surface area of the third abrasive particles, respectively, one of the specific surface areas $T_A$, $T_B$, and $T_C$ has a value of "0,"

$K_A$, $K_B$ and $K_C$ denote a ratio of an amount of the first abrasive particles to a total amount of the abrasive particles, a ratio of an amount of the second abrasive particles to the total amount of the abrasive particles and a ratio of an amount of the third abrasive particles to the total amount of the abrasive particles, respectively, and $0 \leq K_A < 1$, $0 \leq K_B < 1$, and $0 \leq K_C < 1$ are satisfied, wherein the first abrasive particles have a specific surface area of 70 $m^2/e$ to 120 $m^2/g$, the second abrasive particles have a specific surface area of 25 $m^2/g$ to 70 $m^2/g$, and the third abrasive particles have a specific surface area of 10 $m^2/g$ to 25 $m^2/g$.

7. The tungsten polishing slurry composition of claim 6, wherein the first abrasive particles are present in an amount of 10 wt % to 70 wt % in all the abrasive particles, the second abrasive particles are present in an amount of 10 wt % to 70 wt % in all the abrasive particles, and the third abrasive particles are present in an amount of 10 wt % to 70 wt % in all the abrasive particles.

8. The tungsten polishing slurry composition of claim 6, wherein a component of a portion of each of the abrasive particles is substituted with a metal ion.

9. The tungsten polishing slurry composition of claim 8, wherein the metal ion has a tetrahedral coordination, and the metal ion comprises at least one selected from the group consisting of iron (Fe), aluminum (Al), arsenic (As), gallium (Ga), boron (B), beryllium (Be), cobalt (Co), chromium (Cr), hafnium (Hf), indium (In), magnesium (Mg), manganese (Mn), nickel (Ni), phosphorus (P), titanium (Ti), vanadium (V), zinc (Zn) and zirconium (Zr).

10. The tungsten polishing slurry composition of claim 8, wherein the abrasive particles are colloidal silica abrasive particles, the metal ion is an Fe ion, and a silicon (Si) ion of a portion of a surface of each of the colloidal silica abrasive particles is substituted with the Fe ion.

11. The tungsten polishing slurry composition of claim 6, wherein a planarization degree of a surface of a tungsten-containing wafer polished using the tungsten polishing slurry composition is 5% or less.

12. The tungsten polishing slurry composition of claim 6, wherein a peak-to-valley roughness Rpv of a surface of a tungsten-containing wafer polished using the tungsten polishing slurry composition is 100 nm or less, and a roughness of the surface is 10 nm or less.

13. The tungsten polishing slurry composition of claim 6, wherein the tungsten polishing slurry composition is used to improve topography of a tungsten-containing wafer.

* * * * *